United States Patent
Sakata et al.

(10) Patent No.: US 7,104,660 B2
(45) Date of Patent: Sep. 12, 2006

(54) MOTORIZED RETRACTING UNIT AND MOTORIZED RETRACTABLE REARVIEW MIRROR

(75) Inventors: Ikuo Sakata, Isehara (JP); Katsuyuki Izumi, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 0 days.

(21) Appl. No.: 10/771,146

(22) Filed: Feb. 4, 2004

(65) Prior Publication Data

US 2004/0218297 A1 Nov. 4, 2004

(30) Foreign Application Priority Data

Feb. 4, 2003 (JP) ............... 2003-027602

(51) Int. Cl.
*G02B 5/08* (2006.01)
*G02B 7/182* (2006.01)
*B60R 1/06* (2006.01)

(52) U.S. Cl. .............. 359/841; 359/872; 359/877; 248/479

(58) Field of Classification Search ........... 359/841, 359/872, 877; 248/479
See application file for complete search history.

(56) References Cited

U.S. PATENT DOCUMENTS

| 4,786,156 | A | * | 11/1988 | Kotani et al. ............... 359/872 |
| 5,172,884 | A | * | 12/1992 | Ishiyama .................... 248/479 |
| 5,315,442 | A | | 5/1994 | Sato et al. |
| 5,579,178 | A | * | 11/1996 | Mochizuki ................. 359/841 |
| 5,636,071 | A | * | 6/1997 | Mochizuki et al. ......... 359/877 |
| 5,781,354 | A | * | 7/1998 | Sakata ....................... 359/841 |
| 6,022,113 | A | * | 2/2000 | Stolpe et al. ............... 359/841 |
| 6,130,514 | A | * | 10/2000 | Oesterholt et al. ......... 318/438 |
| 6,679,610 | B1 | * | 1/2004 | Yamauchi .................. 359/841 |
| 6,793,358 | B1 | * | 9/2004 | Sakata ....................... 359/872 |
| 6,811,270 | B1 | * | 11/2004 | Yoshida ..................... 359/841 |

FOREIGN PATENT DOCUMENTS

| EP | 1 275 558 A2 | 1/2003 |
| EP | 1 369 301 A1 | 12/2003 |
| JP | 11-240385 A | 9/1999 |

* cited by examiner

*Primary Examiner*—Ricky D. Shafer
(74) *Attorney, Agent, or Firm*—Foley & Lardner LLP (57) ABSTRACT

A motorized retracting unit for a motorized retractable rearview mirror for a vehicle includes a shaft holder that has a main shaft, a gear case that is rotatably mounted on the main shaft, a plate, and a transmission mechanism that transmits driving power of a motor to the main shaft. The plate includes a plate member, a shaft supporting member that rotatably supports the main shaft, a motor mounting member on which the motor is mounted, and a flexible member that is provided between the shaft supporting member and the motor mounting member, enabling a relative movement of the shaft supporting member and the motor mounting member.

16 Claims, 6 Drawing Sheets

MOTORIZED RETRACTING UNIT AND MOTORIZED RETRACTABLE REARVIEW MIRROR

CROSS-REFERENCE TO RELATED APPLICATIONS

The present document incorporates by reference the entire contents of Japanese priority document, 2003-27602 filed in Japan on Feb. 4, 2003.

BACKGROUND OF THE INVENTION

1) Field of the Invention

The present invention relates to a motorized retracting unit and a motorized retractable rearview mirror for a vehicle.

2) Description of the Related Art

A motorized retractable rearview mirror is disclosed in U.S. Pat. No. 5,315,442 and Japanese Patent Laid-Open Publication No. H11-240385. In both cases, the rearview mirror assembly is switched between an extended position and a retracted position driven by a motor.

However, in the conventional motorized retractable rearview mirror disclosed, if there is a slight misalignment between a rotating shaft of the mirror assembly and an output shaft of the motor, it may generate an operation noise, degrade durability, and cause an unreliable operation. Thus, it is required to maintain a high degree of precision in dimensions between the rotating shaft of the mirror assembly and the output shaft of the motor.

The latter disclosure takes a misalignment of the rotating shaft of the mirror assembly into consideration; however, it does not mention the misalignment between the rotating shaft of the mirror assembly and the output shaft of the motor.

SUMMARY OF THE INVENTION

It is an object of the present invention to solve at least the problems in the conventional technology.

The motorized retractable rearview mirror for a vehicle, according to one aspect of the present invention includes a mirror base that is fixed on a body of the vehicle, a motorized retracting unit that is mounted on the mirror base, and a mirror assembly that is linked to the motorized retractable unit. The motorized retracting unit includes a motor that provides a driving power, a shaft holder that is fixed to the mirror base, having a main shaft, a gear case that is rotatably mounted on the main shaft, a plate that is rotatably mounted on the main shaft with the gear case, a transmission mechanism that transmits the driving power of the motor to the main shaft, being housed in the gear case between an output shaft of the motor and the main shaft. The plate includes a plate member, a shaft supporting member that rotatably supports the main shaft in such a manner that the main shaft is substantially perpendicular to a surface of the plate member, a motor mounting member on which the motor is mounted in such a manner that the output shaft of the motor is substantially perpendicular to the surface of the plate member, and a flexible member that is provided between the shaft supporting member and the motor mounting member, enabling a relative movement of the shaft supporting member and the motor mounting member.

The motorized retracting unit for a motorized retractable rearview mirror for a vehicle, according to another aspect of the present invention includes a motor that provides a driving power, a shaft holder that is fixed to the mirror base, having a main shaft, a gear case that is rotatably mounted on the main shaft, a plate that is rotatably mounted on the main shaft with the gear case, a transmission mechanism that transmits the driving power of the motor to the main shaft, being housed in the gear case between an output shaft of the motor and the main shaft. The plate includes a plate member, a shaft supporting member that rotatably supports the main shaft in such a manner that the main shaft is substantially perpendicular to a surface of the plate member, a motor mounting member on which the motor is mounted in such a manner that the output shaft of the motor is substantially perpendicular to the surface of the plate member, and a flexible member that is provided between the shaft supporting member and the motor mounting member, enabling a relative movement of the shaft supporting member and the motor mounting member.

The other objects, features, and advantages of the present invention are specifically set forth in or will become apparent from the following detailed descriptions of the invention when read in conjunction with the accompanying drawings.

DETAILED DESCRIPTION

Exemplary embodiments of a motorized retracting unit and a motorized retractable rearview mirror are explained in detail with reference to the accompanying drawings. Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

Figure 1:
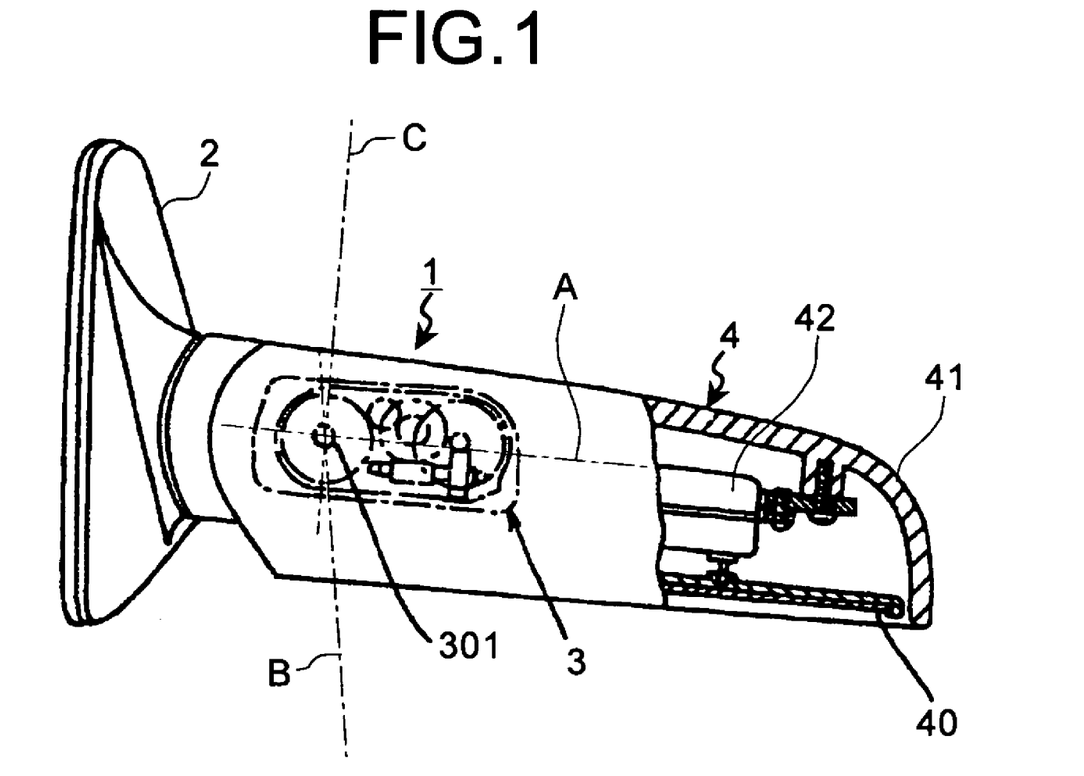
FIG. 1 is a schematic diagram of a motorized retractable rearview mirror including a motorized retracting unit according to an embodiment of the present invention.

FIG. 1 is a schematic diagram of a motorized retractable rearview mirror including a motorized retracting unit according to an embodiment of the present invention. A motorized retractable rearview mirror 1 is mounted on either the left side or the right side of a vehicle. The motorized retractable rearview mirror 1 includes a mirror base 2 that is fixed to the left side and the right side of the vehicle, a motorized retracting unit 3 mounted on the mirror base 2, and a mirror assembly 4 that is mounted on the motorized retracting unit 3.

Figure 2:
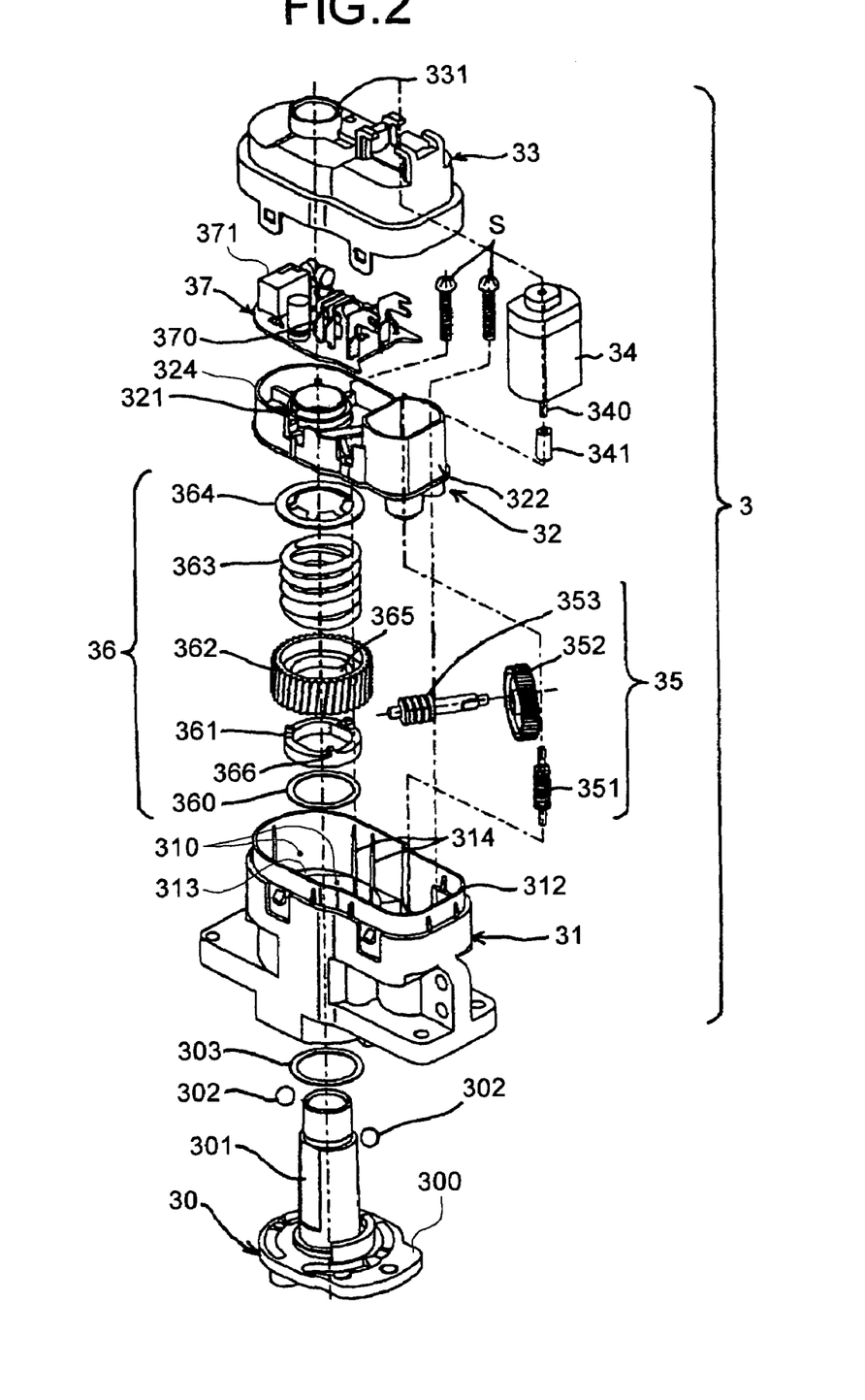
FIG. 2 is an assembly diagram of the motorized retracting unit.
Figure 3:
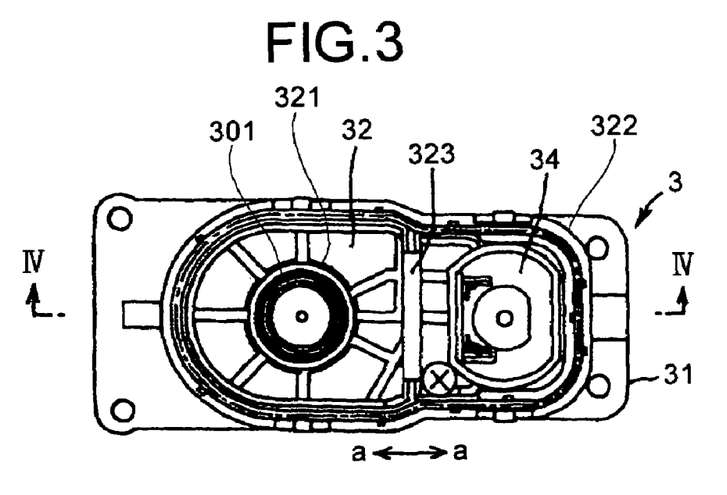
FIG. 3 is a top view of the motorized retracting unit excluding a cover and a switch circuit board.
Figure 4:
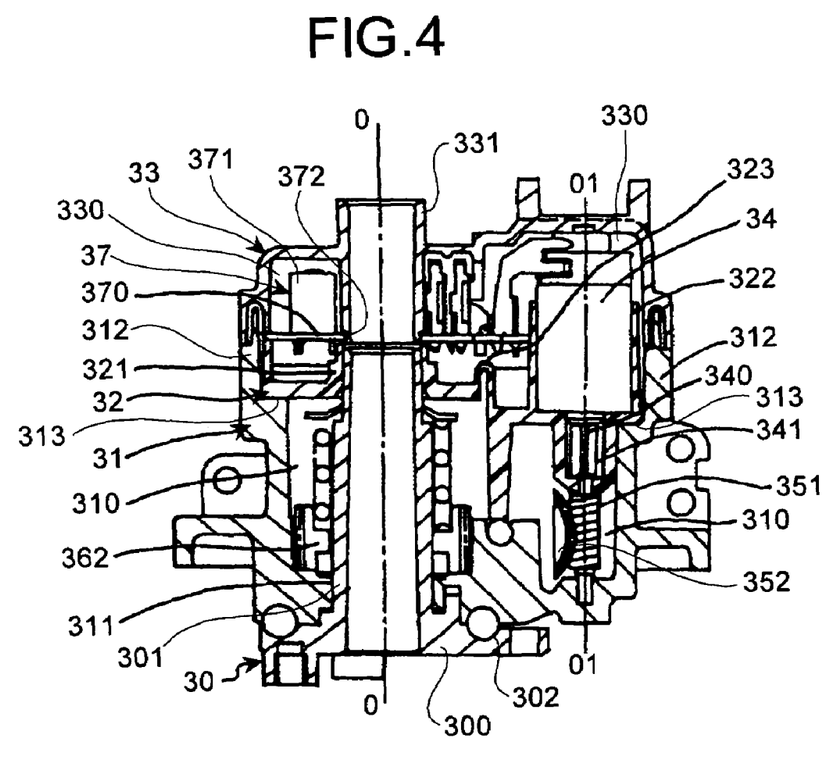
FIG. 4 is a cross section of the motorized retracting unit cut along the line IV—IV in FIG. 3.

FIG. 2 to FIG. 4 are schematic diagrams for illustrating the motorized retracting unit 3 that includes a shaft holder 30 at the stationary end, a gear case 31, a plate 32, and a cover 33 at the rotating end, a motor 34, a deceleration mechanism 35 and a clutch mechanism 36 of a power transmission mechanism, and a switch mechanism 37.

The shaft holder 30 includes a fixed plate 300, and a shaft 301 that is located roughly at the center of the fixed plate 300 and is integral with a surface (top) of the fixed plate 300. The fixed place 300 of the shaft holder 30 is fixed to the mirror base 2.

The gear case 31 includes a closed end (bottom end) with the other end (top end) being open and has a concave-shaped cross section. In other words, the gear case 31 has a concave-shaped housing base 310 that is closed on the side of the shaft holder 30 and open on the side of the plate 32 and the cover 33. In the closed (bottom) portion of the gear case 31 is provided an insertion slot 311 into which the shaft 301 is inserted. As a result of this arrangement, the gear case 31 is rotatably fitted to the shaft 301. Balls 302 and a washer 303 are disposed between the closed portion of the gear case 31 and the fixed plate 300 of the shaft holder 30. A peripheral wall 312 of the gear case 31 (that is, the wall that compartmentalizes the housing base 310) on its inner surface makes a tapered-shape from the open end to the closed end of the gear case 31. A step 313 is provided on the inner surface of the peripheral wall 312 close to the open end of the peripheral wall 312 of the gear case 31. Guide ribs 314 that are integral with the inner surface of the peripheral wall 312 of the gear case 31 run from the open end up to the step 313.

Figure 5:
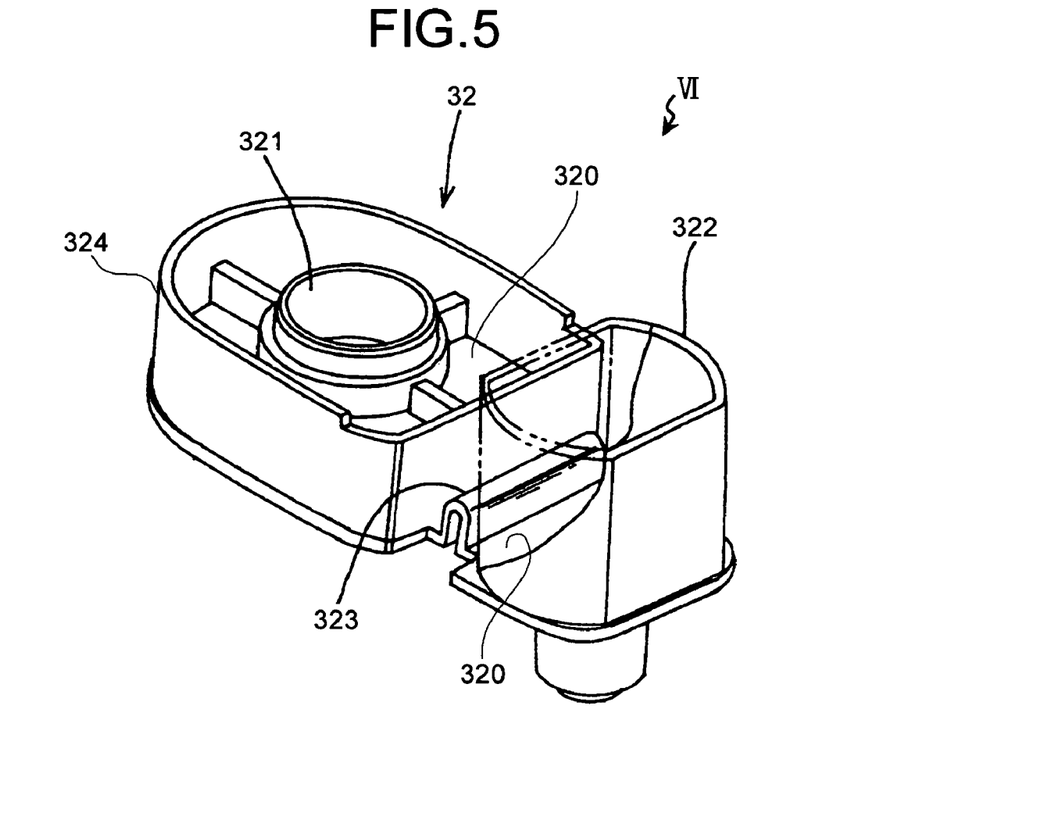
FIG. 5 is a schematic diagram of a plate.
Figure 6:
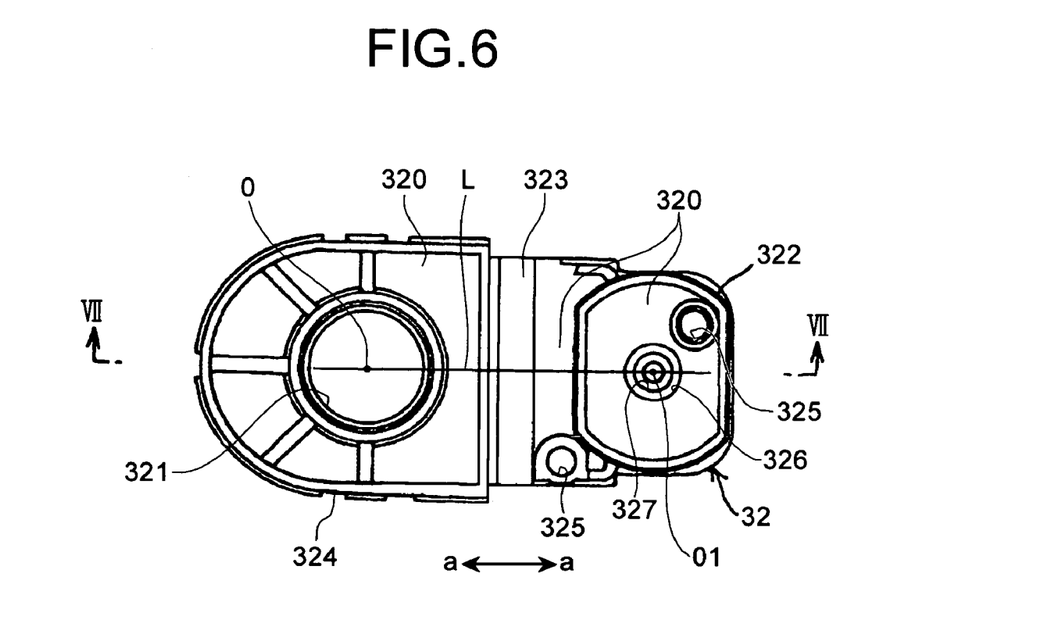
FIG. 6 is a top view of the plate shown in FIG. 5.
Figure 7:
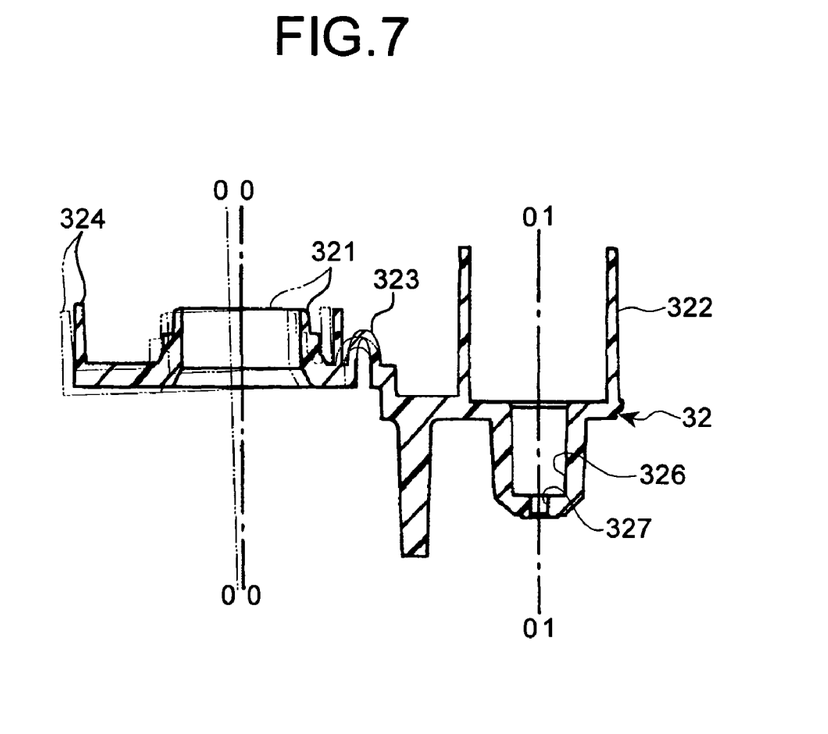
FIG. 7 is a cross section of the plate cut along the line VII—VII in FIG. 6.

FIG. 5 to FIG. 7 are schematic diagrams for illustrating a plate 32 that includes a flat plate 320, a shaft support member 321, a motor holder 322, and a flexible member 323, forming an integrated unit. The flat plate 320 fits onto and closes the open end of the housing base 310 of the gear case 13. The shaft support member 321 which is a short hollow column-shaped bracket is provided integral with the flat plate 320 on one side of the flat plate 320. The motor holder 322 is provided integral with the flat plate 320 on the other side of the flat plate 320. The motor holder 322 has the general external contours of the motor 34. The flexible member 323 which has an inverted U-shaped cross section is provided integral with the flat plate 320 in the center of the flat plate 320. An outer wall 324 integrally surrounds all portions of the flat plate 320 except where the motor holder 322 is disposed. A screw hole 325 is provided in the portion of the flat plate 320 from the flexible member 323 to the flat plate 320 on the side of the motor holder 322, and the flat plate 320 that is beneath the motor holder 322. A recess 326 is provided in the flat plate 320 that is beneath the motor holder 322. A through hole 327 is provided at the bottom of the recess 326.

The shaft support member 321 rotatably supports roughly perpendicular to the face of the flat plate 320 one end (the top end, that is, the end opposite to the shaft holder 30) of the shaft 301. The motor holder 322 holds the motor 34 in such a way that the output shaft 340 of the motor 34 is roughly perpendicular to the face of the flat plate 320. The flexible member 323 is disposed between the axis support member 321 of the flat plate 320 and the motor holder 322 and enables movement of the shaft support member 321 and the motor holder 322 relative to each other. The flexible member 323 is disposed along the direction that is orthogonal to the line L joining the center O of the shaft 301 with the center O1 of the output shaft 340.

The plate 32 is guided by the guide ribs 314 until it rests on the step 313, engaging inside the peripheral wall 312 of the gear case 31 and closing the opening of the housing base 310 of the gear case 31. The flat plate 320 of the plate 32 lying between the flexible member 323 and the motor holder 322, and the flat plate 320 beneath the motor holder 322 are fixed to the gear case 312 by screws S passing through the screw holes 325. On the other hand, the flat plate 320 of the plate 32 lying between the flexible member 323 and the shaft support member 321 is free and movable with respect to the gear case 31. The shaft 301 is engaged in the shaft support member 321 of the plate 32. As a result, the plate 32, along with the gear case 31, is rotatably attached to the shaft 301. One end (the top end, that is, the end opposite to the shaft holder 30) of the shaft 301 is rotatably supported almost perpendicular with respect to the face of the flat plate 320.

The cover 33 includes a closed end (top end) with the other end (bottom end) being open and has a concave-shaped cross section. In other words, the cover 33 has a concave-shaped housing base 330 which is open on the side of the gear case 31 and the plate 32 and closed at the other end. The cover 33 is provided with a harness bush 331 that communicates with the shaft support member 321. The cover 33 engages outside the peripheral wall 312 of the gear case 31. As a result, the plate 32 is placed in the housing bases 330 and 310 that are compartmentalized by the cover 33 and the gear case. Along with the gear case 31 and the plate 32, the cover 33 is also rotatably attached to the shaft 301.

The motor 34 is mounted inside the motor holder 322 of the plate 32. In this way, an output shaft 340 of the motor 34 is disposed almost perpendicular to the face of the flat plate 320 of the plate 32.

The deceleration mechanism 35 and the clutch mechanism 36 of the power transmission mechanism are housed in the housing base 310 of the gear case 310, as shown in FIG. 2 and FIG. 4. This unit is disposed between the output shaft 340 of the motor 34 and the shaft 301, thereby transmitting to the shaft 301 the power of the motor 34.

The deceleration mechanism 35 comprises a first worm gear 351, a helical gear 352 that engages with the first worm gear 351, and a second worm gear 353 that engages with the helical gear 352. The first worm gear 352 passes through the through hole 327 of the plate 32 and connects through a joint 341 of the output axis 340 of the motor 34 with the recess 326 of the plate 32. The clutch mechanism 36 comprises a clutch holder 361, a clutch gear 362, a spring 363, and a push nut 364. The clutch mechanism 36 is formed by an assembly of the washer 360, clutch holder 361, clutch gear 362, and spring 363 in that sequence and exertion of pressure on the shaft 301 by the push nut 364 exerting pressure on the spring 363. A convexity 366 formed on the surface of the clutch holder 361 engages into a concavity 365 formed in the inner surface of the clutch gear 362. The power of the motor 34 is transmitted to the shaft 301 by the engagement between the second worm gear 353 of the deceleration mechanism 35 and the clutch gear 362 of the clutch mechanism.

The switch mechanism 37 comprises a circuit board 370 and a switch circuit 371 mounted on the circuit board 370. The circuit board 370 covers the outer wall 324 of the plate 32 except the portion where the motor holder 322 is disposed. The circuit board 370 has a communicating hole 372 that communicates with the shaft support member 321 of the plate 32 and the harness bush 331 of the cover 33. The switch mechanism 37 is housed in the housing base 330 of the cover. The switch mechanism 37 is electrically connected through a not shown harness to the motor 34, a not shown power supply, and a not shown switch provided in the vehicle.

The mirror assembly 4 comprises a mirror unit 40 having a reflecting surface, a mirror housing 41 having an opening, and a power unit 42 that is fixed within the mirror housing 41 and that can tilt the mirror unit 40 vertically and horizontally in the opening of the mirror housing 41.

The mechanism of the motorized retractable rearview mirror 1 according to the present embodiment having the structure described above will be explained next.

Upon driving the motor 34 by operating the switch provided in the vehicle, the torque of the motor 34 is transmitted, via the output shaft 340, joint 341, and the deceleration mechanism 35, to the clutch gear 362 fixed to the shaft 301. As the clutch gear 362 is non-rotatably fixed to the shaft 301, the second worm gear 353 of the deceleration mechanism 35 rotates around the clutch gear 362. Due to the rotation of the second worm gear 353, the mirror assembly 4 housed in the motorized retracting unit 3 rotates around the shaft 301. The mirror assembly 4 can in this way be rotated between an extended position A and a retracted position B, as shown in FIG. 1. Once the mirror assembly 4 reaches either the extended position A or the retracted position B, the power to the motor 34 is cut off by the switch operation of the switch mechanism 37 and the mirror assembly 4 halts at the position.

If a load is applied on the mirror assembly 4 from the front and the back, the clutch gear 362 rotates against the suppress strength of the spring 363, and the concavity and the convexity (365 and 366) of the clutch gear 362 and the clutch holder disengage from each other. Thus, by the clutching action of the clutch mechanism 36, the mirror assembly 4 rotates between the extended position A and the retracted position B or between the extended position A and a forward tilted position C.

The effects of the motorized retractable rearview mirror 1 according to the present invention will be explained next.

The portion of the plate 32 from the flexible member 323 to the motor holder 322 is fixed to the gear case 31, while the portion of the plate 32 from the flexible member 323 to the shaft support member 321 is free with respect to the gear case 31. Consequently, variations may arise in the positions of parts such as the shaft holder 30 or the gear case 31, or a variation may arise in the assembly of the parts such as the gear case 30 or the plate 32 which may further lead to stress to tilt the shaft holder 30 during motorized retraction. When the tilt occurs, the portion of the plate 32 from the flexible member 323 to the shaft support member 321 shifts or is displaced, as shown by the chain double-dashed line in FIG. 7. However, the portion of the plate from the flexible member 323 and the motor holder 322 is fixed, as shown by the solid line in FIG. 7. The flexible member 323 that is provided between the shaft support member 321 and the motor holder 322 of the plate absorbs the shift or displacement by exerting a flexible force (elastic force) along the direction of the double-headed arrow a—a (that is along the line L) shown in FIG. 3 and FIG. 6. Consequently, even if the portion of the plate 32 from the flexible member 323 to the shaft support member 321 shifts or is displaced, this shift or displacement does not get conveyed to the motor shaft (the output shaft 340 and the shaft center O1—O1 of the first worm gear 351 of the motor) since the portion of the plate 32 from the flexible member 323 to the motor holder 322 is fixed.

Consequently, the precision related to the shaft positions or assembly of the parts can be relaxed in the motorized retractable rearview mirror 1, thereby enhancing the productivity and reliability of the product. Further, the degree of parallelness between the shaft center O—O of the shaft 301 and the motor axis O1—O1 also improves because of which the power is transmitted smoothly. Furthermore, problems such as squeaky noise on operation, durability problem, and performance reliability problem, etc. are eliminated in the motorized retractable rearview mirror 1 according to the present embodiment since the distance between the rotating shaft (shaft 301) of the mirror assembly 4 and the output shaft 340 of the motor 34 is maintained.

In the motorized retractable rearview mirror 1 according to the present embodiment, the number of components and the number of steps for assembling the parts is reduced since the shaft support member 321 and the motor holder 322 of the plate 32 are integrated by means of the flexible member 323. Further, in the motorized retractable rearview mirror 1 according to the present embodiment, even if the shaft support member 321 and the motor holder 322 of the plate 32 are made rigid, the effect described earlier can be achieved by the flexible nature of the flexible member 323 sandwiched between the shaft support member 321 and the motor holder 322.

In the motorized retractable rearview mirror 1 according to the embodiment, the inner surface of the peripheral wall 312 (housing base 310) is tapered, thus facilitating the housing of the deceleration mechanism 35 of the power transmission mechanism and the clutch mechanism 36 inside the housing base 310 of the gear case 31, and enhancing the ease of assembly. Further, the plate 32 can be securely fitted in the gear case 31 by the guide ribs 314 provided on the inner surface of the peripheral wall 312 of the gear case 31. The plate 32, when fitted securely in the gear case 31, realizes the functions described below.

In other words, the functions of the plate 32 involve maintaining the distance (degree of parallelness) between the center of the shaft 301 O—O and the motor shaft O1—O1, preventing the tilting of the shaft holder 30 from the stress arising due to the rotation, bearing the circuit board 370 of the switch mechanism 37, preventing the shifting of the second worm gear 353 towards the shaft, bearing the motor 34, etc.

Figure 8:
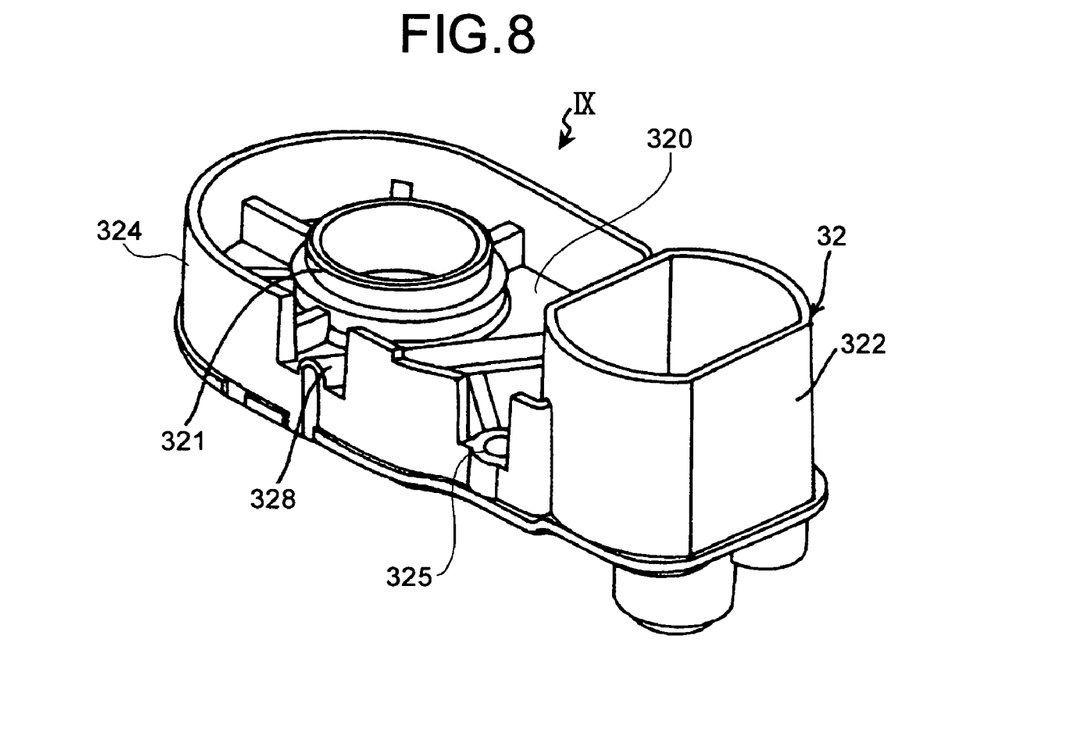
FIG. 8 is a schematic diagram for illustrating an example of a modification of the plate.
Figure 9:
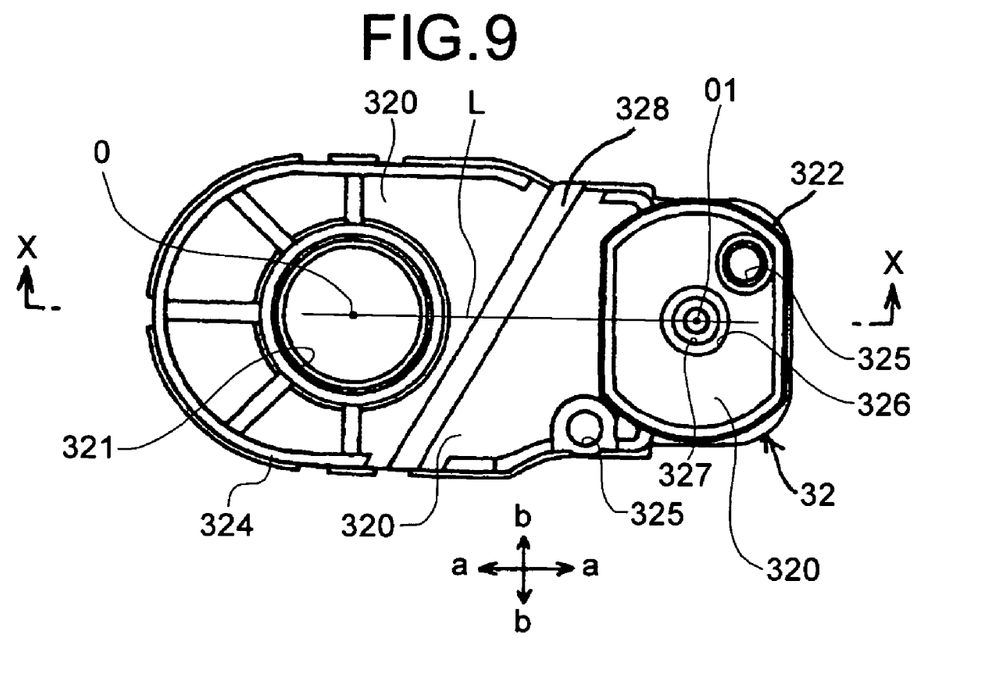
FIG. 9 is a top view of the plate shown in FIG. 8.
Figure 10:
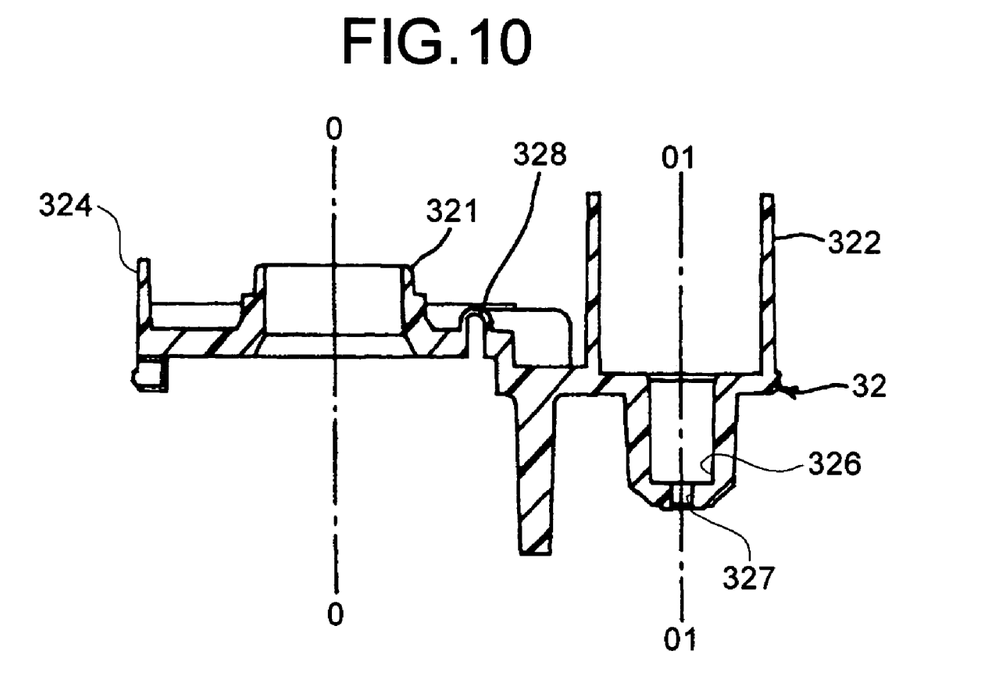
FIG. 10 is a cross section of the plate cut along the line X—X in FIG. 9.

FIG. 8 to FIG. 10 are schematic diagrams for illustrating an example of a modification the plate 32. In the modification of the plate 32, a flexible member 328 that is sandwiched between the shaft support member 321 and the motor casing holder 322 is disposed obliquely with respect to the line L joining the center O of the shaft 301 and the center O1 of the output shaft 340 of the motor 34. The flexible force (elastic force) of this obliquely disposed flexible member 328 acts along the arrow a—a (that is along the line L) and the arrow b—b (roughly perpendicular to the line L) shown in FIG. 9. Consequently, the flexible member 328 is able to absorb the errors in the dimension. Moreover, the assembly of the plate 32 and the gear case 31 is more secure.

The present embodiment is explained by presenting a motorized retractable rearview mirror 1 for the right side of a vehicle. The mechanism of a motorized retractable rearview mirror for the left-side of the vehicle would be identical.

In the present embodiment, the cross section of the flexible member 323 and 328 has the shape of an inverted U. However, the cross section of the flexible members 323 and 328 may be at least one of the following shapes: U-shaped, V-shaped, inverted V-shaped, W-shaped, M-shaped, N-shaped, S-shaped.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A motorized retractable rearview mirror for a vehicle having a body with a door, comprising:
   a mirror base configured to be fixed on the body of the vehicle;
   a motorized retracting unit that is mounted on the mirror base, including
      a motor that provides a driving power via an output shaft;
      a shaft holder that is fixed to the mirror base, having a main shaft;
      a gear case that is rotatably mounted on the main shaft;
      a plate that is rotatably mounted on the main shaft with the gear case, including
         a plate member having a surface;
         a shaft supporting member that rotatably supports the main shaft in such a manner that the main shaft is substantially perpendicular to the surface of the plate member;
         a motor mounting member on which the motor is mounted in such a manner that the output shaft is substantially perpendicular to the surface of the plate member; and
         a flexible member that is provided between the shaft supporting member and the motor mounting member, enabling a relative movement of the shaft supporting member and the motor mounting member, the motor mounting member being separated from the shaft supporting member by the flexible member along an entire length of the flexible member; and
      a transmission mechanism that transmits the driving power of the motor to the main shaft, being housed in the gear case between the output shaft and the main shaft; and
   a mirror assembly that is linked to the motorized retractable unit.

2. The motorized retractable rearview mirror according to claim 1, wherein the flexible member is disposed on the plate along a line obliquely with respect to a line connecting a center of the main shaft and a center of the output shaft along an entire length of the flexible member.

3. The motorized retractable rearview mirror according to claim 1, wherein the flexible member has a cross section of at least one of U-shape, inverted U-shape, V-shape, inverted V-shape, W-shape, M-shape, N-shape, S-shape, or thin plain shape.

4. The motorized retractable rearview mirror according to claim 1, wherein at least either of a portion of the plate member from the flexible member to the motor mounting member or the motor mounting member is fixed to the gear case by means of a fixing member.

5. The motorized retractable rearview mirror according to claim 4, wherein the fixing member is a screw.

6. The motorized retractable rearview mirror according to claim 1, wherein
   the gear case has a hollow space with a peripheral wall formed by a side of the shaft holder being closed-end and a side of the plate being open-end,
   an inner side of the peripheral wall has either of guide grooves or guide notches from the open end to the closed end, and
   the plate is guided along either of the guide grooves or the guide notches to fit inside the peripheral wall closing the open-end.

7. The motorized retractable rearview mirror according to claim 1, wherein the flexible member is disposed on the plate along a line perpendicular to a line connecting a center of the main shaft and a center of the output shaft.

8. A motorized retracting unit for a motorized retractable rearview mirror for a vehicle, comprising:
   a motor that provides a driving power via an output shaft;
   a shaft holder that has a main shaft;
   a gear case that is rotatably mounted on the main shaft;
   a plate that is rotatably mounted on the main shaft with the gear case, including
      a plate member having a surface;
      a shaft supporting member that rotatably supports the main shaft in such a manner that the main shaft is substantially perpendicular to the surface of the plate member;
      a motor mounting member on which the motor is mounted in such a manner that the output shaft is substantially perpendicular to the surface of the plate member; and
      a flexible member that is provided between the shaft supporting member and the motor mounting member, enabling a relative movement of the shaft supporting member and the motor mounting member, the motor mounting member being separated from the shaft supporting member by the flexible member along an entire length of the flexible member; and
   a transmission mechanism that transmits the driving power of the motor to the main shaft, being housed in the gear case between the output shaft and the main shaft.

9. The motorized retracting unit according to claim 8, wherein the flexible member is disposed on the plate along a line obliquely with respect to a line connecting a center of the main shaft and a center of the output shaft along an entire length of the flexible member.

10. The motorized retracting unit according to claim 8, wherein the flexible member has a cross section of at least one of U-shape, inverted U-shape, V-shape, inverted V-shape, W-shape, M-shape, N-shape, S-shape, or thin plain shape.

11. The motorized retracting unit according to claim 8, wherein at least either of a portion of the plate member from the flexible member to the motor mounting member or the motor mounting member is fixed to the gear case by means of a fixing member.

12. The motorized retracting unit according to claim 11, wherein the fixing member is a screw.

13. The motorized retracting unit according to claim 8, wherein
   the gear case has a hollow space with a peripheral wall formed by a side of the shaft holder being closed-end and a side of the plate being open-end,
   an inner side of the peripheral wall has either of guide grooves or guide notches from the open end to the closed end, and
   the plate is guided along either of the guide grooves or the guide notches to fit inside the peripheral wall closing the open-end.

14. The motorized retracting unit according to claim 8, wherein the flexible member is disposed on the plate along a line perpendicular to a line connecting a center of the main shaft and a center of the output shaft.

15. A motorized retracting unit for a motorized retractable rearview mirror for a vehicle, comprising:
   a motor providing a driving power via an output shaft;
   a shaft holder having a main shaft;
   a plate rotatably mounted on the main shaft, including
      a plate member having a surface;

a shaft supporting member rotatably supporting the main shaft in such a manner that the main shaft is substantially perpendicular to the surface of the plate member;

a motor mounting member on which the motor is mounted in such a manner that the output shaft is substantially perpendicular to the surface of the plate member; and a flexible member provided between the shaft supporting member and the motor mounting member, enabling a relative movement of the shaft supporting member and the motor mounting member, the motor mounting member being separated from the shaft supporting member by the flexible member along an entire length of the flexible member; and a transmission mechanism that transmits the driving power of the motor to the main shaft.

16. A motorized retractable rearview mirror for a vehicle having a body with a door, comprising:

a mirror base configured to be fixed on the body of the vehicle;

a motorized retracting unit that is mounted on the mirror base, including a motor that provides a driving power via an output shaft;

a shaft holder that is fixed to the mirror base, having a main shaft;

a gear case that is rotatably mounted on the main shaft;

a plate that is rotatably mounted on the main shaft with the gear case, including a plate member having a surface;

a shaft supporting member that rotatably supports the main shaft in such a manner that the main shaft is substantially perpendicular to the surface of the plate member;

a motor mounting member on which the motor is mounted in such a manner that the output shaft is substantially perpendicular to the surface of the plate member; and a flexible member that is provided between the shaft supporting member and the motor mounting member, enabling a relative movement of the shaft supporting member and the motor mounting member, the flexible member having first and second substantially parallel sides, each of which extends between the shaft supporting member and the motor mounting member along an entire length of the first and second substantially parallel sides; and a transmission mechanism that transmits the driving power of the motor to the main shaft, being housed in the gear case between the output shaft and the main shaft; and a mirror assembly that is linked to the motorized retractable unit.

* * * * *